May 27, 1930.  W. G. DUNN  1,760,348
AWNING STRUCTURE SUPPORT AND TENSIONING MECHANISM
Filed May 19, 1927
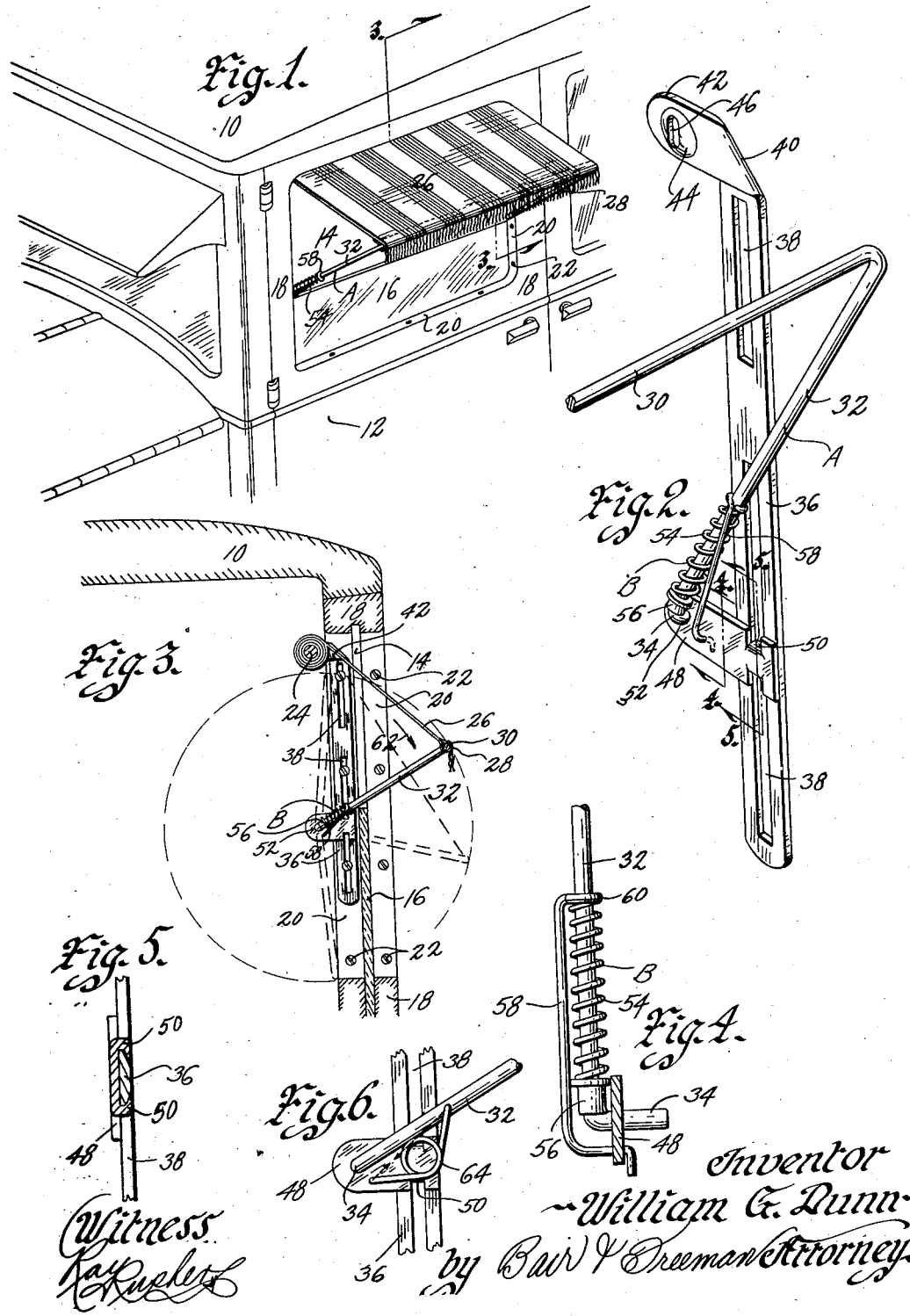

Patented May 27, 1930

1,760,348

UNITED STATES PATENT OFFICE

WILLIAM G. DUNN, OF CLARINDA, IOWA

AWNING STRUCTURE SUPPORT AND TENSIONING MECHANISM

Application filed May 19, 1927. Serial No. 192,543.

The object of my invention is to provide an awning structure support and tensioning means of simple construction whereby an awning may be supported and held under tension for preventing flapping when subjected to the wind as is the case when the awning is supported upon automobiles.

More particularly it is my object to provide supporting brackets adapted to be mounted upon the window frames of an automobile and arranged to support an awning roller as well as a U-frame for the awning whereby the awning may be projected outwardly from the automobile or projected inwardly within the automobile and the U-frame being provided with a tensioning element whereby there is a tendency for the U-frame to be moved away from the awning roller thus maintaining the awning taut at all times.

Still another object is to provide a pair of brackets which may be easily mounted upon the automobile window frames employing the usual screws for holding the metal or wood trimmings upon the automobile adjacent the window thereof.

With these and other objects in view, my invention consists in the construction and arrangement of the various parts of my awning structure support and tensioning mechanism, whereby the objects contemplated are attained, as hereinafter more fully set forth, pointed out in my claims and illustrated in the accompanying drawings, in which:

Figure 1 is a perspective view of one corner of an automobile of the sedan type with my improved awning structure support and tensioning means mounted thereon.

Figure 2 is a perspective view of one bracket of the awning support with the tensioning means mounted upon the U-frame thereof.

Figure 3 is a sectional view taken on the line 3—3 of Figure 1.

Figure 4 is a sectional view taken on the line 4—4 of Figure 2 illustrating the tensioning means.

Figure 5 is a detail sectional view taken on the line 5—5 of Figure 1 and

Figure 6 is a detail view of a tensioning means slightly modified from that illustrated in Figure 4 of the drawings.

In the accompanying drawings I have used the reference numeral 10 to indicate generally an automobile of the sedan type which is provided with a door 12 having a window opening 14 therein and a window 16 slidably mounted in the window frame 18.

The glass or window 16 is held within the window frame 18 by the so-called window trim 20. The window trim 20 is secured to the window frame 18 by screws or the like 22. The parts just described are of the ordinary construction now found in automobiles.

While I have illustrated my awning support as mounted upon the door 12 it will, of course, be understood that the awning structure may be mounted upon any window frame of an automobile.

The usual awning structure of the rolling type includes a spring actuated roller 24 having a canvas element 26 adapted to be rolled upon or unrolled from the roller 24. The roller 24 is of the ordinary kind and is spring actuated. One end of the canvas 26 which forms the awning proper is formed with a loop 28 for receiving the cross connecting portion 30 of a U-frame A. The cross connecting portion 30 has a pair of arms 32 at its sides which constitute the U-frame.

The free ends of the arms 32 are bent outwardly and substantially at right angles to the arms 32 for forming trunnions or pivot shafts 34. In order to mount the spring actuated roller 24 and the U-frame A in proper position, I provide a pair of similar supporting elements 36. The supporting elements 36 are of strap like material and formed with spaced elongated slots 38.

The supporting elements 36 may be mounted adjacent the window 16 upon the frame 18 by removing several of the screws 22 and then replacing the screws 22 through the slots 38. By providing the slots 38 extending lengthwise of the supporting elements 36 I am able to use several of the screws 26 for supporting the element 36 upon the window frame 18. The supporting elements 36 may thus be easily and quickly installed upon the automobile window frame.

The upper end of each of the supporting elements 36 is folded over as at 40 for forming an inturned extension 42. The extension 42 is at substantially right angles to the major portion of the supporting element 36. The extension 42 has a dished portion 44 provided with a slot or notch 46. The slot or notch 46 is designed to receive the trunnions or pivot shafts ordinarily found upon spring actuated rollers.

The extension 42 projects inwardly within the automobile as clearly illustrated in Figure 3 of the drawings. In order to mount the U-frame A upon the supporting elements 36 I provide an inwardly extending bracket 48 having a pair of bent over fingers 50 which extend into two adjacent slots 38 and around a portion of the material of the supporting element 36 as clearly illustrated in Figure 5 of the drawings.

It will thus be seen that the bracket 48 is securely anchored upon the supporting element 36. Each bracket 48 is provided with an opening 52 which receives the trunnions or pivot shafts 34 of the U-frame A.

From the construction of the parts just described, it will be seen that the U-frame A is permitted to rotate within its bearings and thus the awning or canvas 26 may be projected outwardly or inwardly and moved to various positions as illustrated by the dotted lines in Figure 3 of the drawings.

The U-frame is of sufficient length so as to permit it to pass in below the spring actuated roller 24 when it is desired to have the awning or canvas 26 serve as a curtain within the automobile proper.

It may be here mentioned that there is a tendency for the awning or canvas 26 to flap and not to be taut at all times. This I avoid by providing a tensioning mechanism B which is mounted upon each of the arms 32 of the frame A and co-operates with a portion of the bracket 48. The tensioning mechanism B as illustrated in Figure 2 of the drawings includes a coil spring 54 mounted upon each of the arms 32 of the U-frame A.

A washer or sleeve structure 56 is also mounted upon each of the arms 32 and has one end of the coil spring 54 resting thereagainst.

A constraining link 58 has one end pivotally connected to the bracket 48 at a point spaced from the pivot connection of the U-frame A with the bracket 48. The pivotal connection between the constraining link 58 and the bracket 48 is formed by inserting the link 58 through an opening in the bracket and having a downturned end upon the link whereby the link is held upon the bracket 48.

The free end of the link 58 is formed with a loop 60 adapted to extend around the arm 32 and to permit sliding movement of the arm 32 relative to the loop 60. The coil spring 54 has one end in engagement with the loop 60.

The spring 54 is normally under tension and is constrained by the constraining link 58. In view of the fact that the constraining link is upon an independent pivot point that is upon a pivot point spaced from the pivot point of the frame A, there is a tendency for the spring 54 to spread and after this is done the tendency is to force or apply tension upon the frame A in a downward direction or in a direction as indicated by the arrow 62.

The canvas 26 which forms the awning proper is thus held taut. The spring actuated roller 24 after it has been set and the canvas 26 unrolled therefrom, remains in its set position and the tensioning mechanism B then operates for holding the frame A under a tension tending to move it in a direction away from the spring actuated roller 24 and as indicated by the arrow 62.

In Figure 6 of the drawings I have shown a coil spring 64 having one end pivotally connected to the bracket 48 and its other end pivotally connected to the arm 32 of the frame A.

Some changes may be made in the arrangement and construction of the various parts of my awning structure support and tensioning mechanism, without departing from the real spirit and purpose of my invention, and it is my intention to cover by my claims any modified forms of structure and use of mechanical equivalents, which may be reasonably included within their scope.

I claim as my invention:

1. In a roller awning structure including an awning supporting arm, a bracket having an opening therein for pivotal coaction of said arm therewith and spring means tending to move said arm away from the roller of said awning structure, said spring means exerting a pressure from a point on said arm toward a point on said bracket spaced from the opening therein, such pressure being exerted in a straight line between said points.

2. In a roller awning structure including an awning supporting arm, a bracket having an opening therein for pivotal coaction of said arm therewith and spring means tending to move said arm away from the roller of said awning structure, said spring means exerting a pressure from a point on said arm toward a point on said bracket spaced from the opening therein, such pressure being exerted in a straight line between said points, such straight line, in one position of said arm, coinciding with the center of said opening.

3. In a roller awning structure including an awning supporting arm, a bracket element having an opening therein for pivotal coaction of said arm therewith and yielding means tending to move said arm away from the roller of said awning structure, said yielding means comprising a spring mounted upon said arm, a constraining link mounted on said arm and engaging the spring at one end, said link having one end pivotally connected to said bracket whereby said arm is constrained to swing toward the connection point of said link with said bracket.

Des Moines, Iowa, March 29, 1927.

WILLIAM G. DUNN.